United States Patent
Burns et al.

(10) Patent No.: US 6,822,556 B2
(45) Date of Patent: Nov. 23, 2004

(54) METHODS AND APPARATUS FOR A MULTI-MODE NIGHT-LIGHT CONFIGURED TO EMULATE A TRAFFIC SIGNAL

(75) Inventors: Lance S. Burns, Glendale, AZ (US); Rosanne L. Burns, Glendale, AZ (US)

(73) Assignee: Kidlights, LLC, Glendale, AZ (US)

( * ) Notice: Subject to any disclaimer, the term of this patent is extended or adjusted under 35 U.S.C. 154(b) by 153 days.

(21) Appl. No.: 10/196,846

(22) Filed: Jul. 17, 2002

(65) Prior Publication Data

US 2004/0012487 A1 Jan. 22, 2004

(51) Int. Cl.⁷ ............................. H05B 41/00; G08B 3/00
(52) U.S. Cl. ...................... 340/332; 340/331; 340/321; 340/691.2; 362/95; 362/226; 362/806; 368/223
(58) Field of Search ................................ 340/332, 908, 340/321, 331, 309.16, 691.1, 691.2; 368/1, 10, 223, 227, 243, 244; 362/95, 226, 249, 800, 806

(56) References Cited

U.S. PATENT DOCUMENTS

| | | | |
|---|---|---|---|
| 2,829,362 A | * 4/1958 | Terrill | 340/908 |
| D216,327 S | 12/1969 | Le Vaggi et al. | D48/20 |
| 4,038,561 A | 7/1977 | Lorenz | 307/141 |
| 4,872,095 A | 10/1989 | Dubak et al. | 362/100 |
| 5,307,051 A | 4/1994 | Sedlmayr | 340/573.1 |
| 5,465,198 A | * 11/1995 | Kellogg | 362/253 |
| 5,544,025 A | * 8/1996 | Bohlool et al. | 362/95 |
| 5,575,098 A | * 11/1996 | Goettel-Schwartz | 40/550 |
| 5,763,872 A | 6/1998 | Ness | 250/214 AL |
| 5,926,440 A | 7/1999 | Chien | 368/10 |
| 6,158,868 A | 12/2000 | Chien | 362/84 |
| 6,165,037 A | 12/2000 | Van Yant | 446/219 |
| 6,170,958 B1 | 1/2001 | Chien | 362/84 |
| 6,300,727 B1 | 10/2001 | Bryde et al. | 315/294 |
| 6,431,719 B1 | * 8/2002 | Lau et al. | 362/95 |
| 2002/0048169 A1 | * 4/2002 | Dowling et al. | 362/234 |

* cited by examiner

Primary Examiner—Donnie L. Crosland
(74) Attorney, Agent, or Firm—Snell & Wilmer L.L.P.

(57) ABSTRACT

A night-light is configured to emulate a traffic signal and thereby train a child to remain in bed during a predetermined interval. In accordance with one embodiment of the present invention, a night-light comprises a housing having a first light emitter (e.g., a red light source), a second light emitter (e.g., a green light source), a controller electrically coupled to the first light emitter and the second light emitter, and a timer interface electrically coupled to the controller, wherein the controller is configured to operate in a first, second, and a third mode. In general, the first mode corresponds to the first light emitter being activated ("bed-time" mode), the second mode corresponds to the second light emitter being activated ("wake-time" mode), and the third mode corresponds to the case where neither the first or second light emitters are activated ("off" mode). The front side of the night-light is configured to substantially simulate the appearance of a traffic signal when used in conjunction with the first and second light emitters. A suitable plug, configured to be inserted into an electrical receptacle, is provided on a back side of the housing to provide power to the controller and/or light emitters.

17 Claims, 6 Drawing Sheets

METHODS AND APPARATUS FOR A MULTI-MODE NIGHT-LIGHT CONFIGURED TO EMULATE A TRAFFIC SIGNAL

BACKGROUND OF THE INVENTION

1. Technical Field

This invention generally relates to night-lights and, more particularly, to a night-light configured to simulate a traffic signal in order to provide a child with a visual cue to remain in bed during a predetermined interval.

2. Background Information

Of the many challenges presented by parenthood, coping with a child's sleep habits ranks quite high on the scale. For example, when a child becomes too old for a crib, but is not yet accustomed to sleeping through the night in a bed, the child has a tendency to rise from bed during the night and wander out of his or her room and into potentially dangerous areas of the home.

The traditional way to prevent a child from wandering throughout the home is to install a gate, typically adjustable, which extends across opposite walls in a hallway and/or a doorway in order to limit, to some extent, the movement of the child within the home. Such systems are unsatisfactory in a number of respects. For example, it is not unusual for preternaturally acrobatic children to climb, flip, or otherwise pull themselves over even the best-designed gates. Furthermore, those gates provide inconvenient (and potentially dangerous) barriers to the parents themselves, who often find themselves hurdling over the gates to reach the child in the middle of the night. In addition, such gates do not effectively train a child to remain in bed; they simply keep him or her in a particular room or set of rooms.

Another common method used to keep a child in his or her bedroom is to lock the door, from the outside. This method, however, can unduly psychologically traumatize the child by creating unnecessary feelings of isolation.

Accordingly, there is a need for a system which overcomes these and other limitations of the prior art.

BRIEF SUMMARY OF THE INVENTION

The present invention overcomes shortcomings in the prior art by providing a night-light configured to emulate a traffic signal and thereby train a child to remain in bed during a predetermined interval. In accordance with one embodiment of the present invention, a nightlight comprises a housing having a first light emitter (e.g., a red light source), a second light emitter (e.g., a green light source), a controller electrically coupled to the first light emitter and the second light emitter, and a timer interface electrically coupled to the controller, wherein the controller is configured to operate in a first, second, and a third mode.

In general, the first mode corresponds to the first light emitter being activated ("bed-time" mode), the second mode corresponds to the second light emitter being activated ("wake-time" mode), and the third mode corresponds to the case where neither the first or second light emitters are activated ("off" mode). The front side of the night-light is configured to substantially simulate the appearance of a traffic signal when used in conjunction with the first and second light emitters. A suitable plug, configured to be inserted into an electrical receptacle, is provided on a back side of the housing to provide power to the controller and/or light emitters.

In order to operate the system, the user first uses the timer interface provided on the night-light (e.g., within the night-light's back surface, which will be proximate the wall when the device is plugged into a suitable electrical receptacle) to set the starting times corresponding to the three modes. The timing of the various modes can be selected such that the red light activates when the child is first put to bed, and then stays on throughout the night. If the child for any reason wakes up while the device is still in the bed-time mode, the red light produced by the device will provide a visual cue to the child that he or she should stay in bed. In the morning, however, when the device enters the wake-up mode and the green light has been activated, the child will interpret the green light to mean that he or she may then get up from bed. After a suitable amount of time (predetermined by the user or otherwise determined) the device will enter the off-mode, and both the green and red lights will be deactivated.

In accordance with a further aspect of the present invention, the timer interface may be configured to allow a user to specify a fourth time which corresponds to the beginning of an initial time period prior to said first bed-time mode. This embodiment, which makes allowances for the fact that children do not typically go to sleep right away, provides a green visual cue during an initial (preferably short) time period in which the child may rise from bed to request water or the like.

In accordance with an alternate embodiment of the present invention, the night-light incorporates a middle signal region (corresponding, for example, to the position of the yellow light on a traditional traffic signal) which includes a clock display which is settable via the timer interface.

In accordance with a further aspect of the present invention, the timer interface (which may be digital, analog, or a combination thereof) is preferably inset within the back side of the housing such that the timer interface is substantially concealed from view when the device is inserted into an electrical receptacle. This prevents the child from tampering with the device and inadvertently (or intentionally) altering the timing of the various modes. Alternatively, the night-light may be configured such that the timer may only be set through a method which is difficult or impossible for a child to manipulate and/or through a dedicated or special time-setting device.

BRIEF DESCRIPTION OF THE DRAWINGS

The subject invention will hereinafter be described in conjunction with the appended drawing figures, wherein like numerals denote like elements, and.

DETAILED DESCRIPTION

The present invention provides a night-light configured to emulate a traffic signal such that the visual cues produced by the night-light's green and red light sources assist in training a child to remain in bed (i.e., the bedroom) during a predetermined interval (e.g., during bed time, nap time, "time-outs," and the like).

Figure 1:
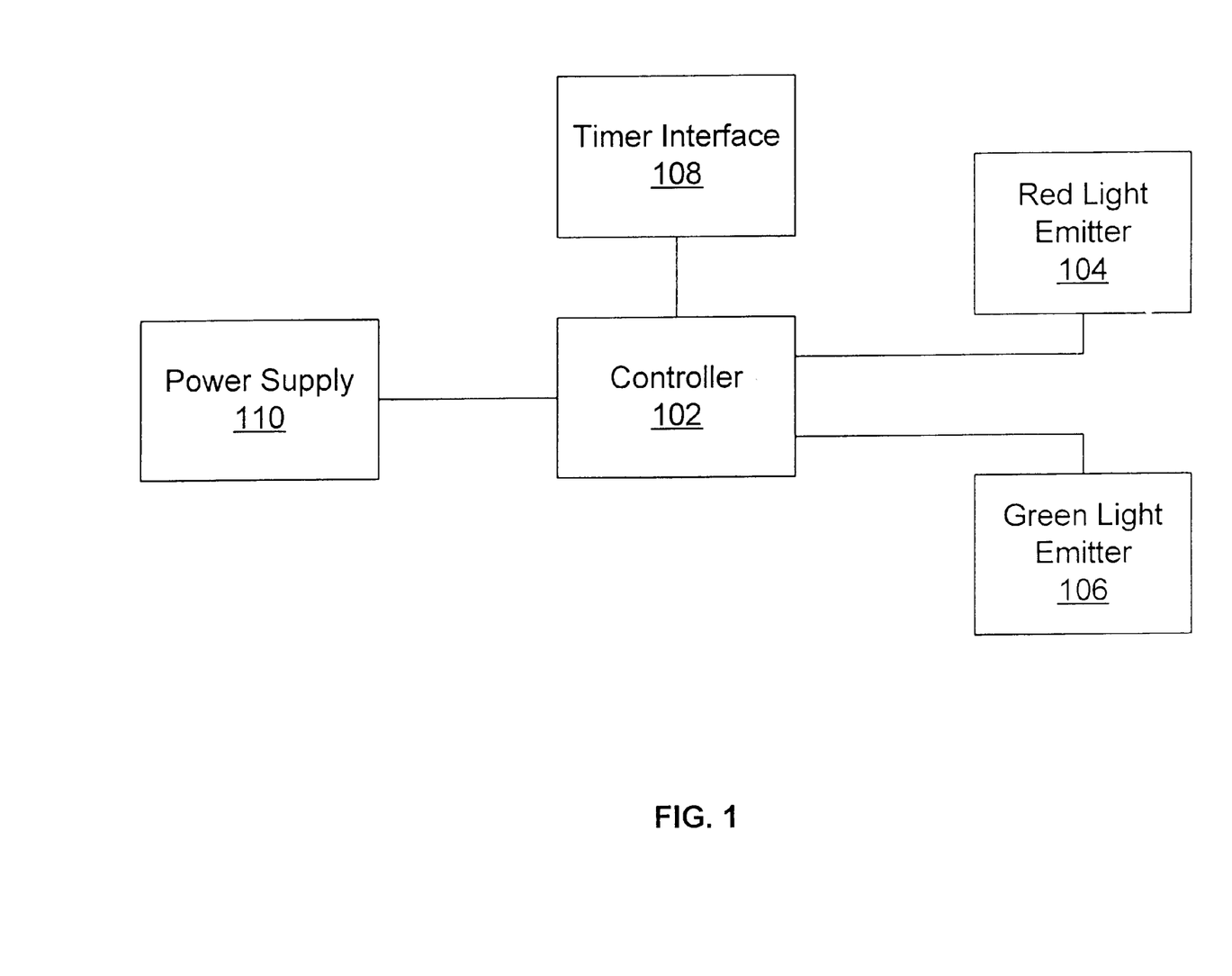
FIG. 1 is a schematic block-diagram of a night-light in accordance with the present invention.

With reference to the schematic block diagram FIG. 1, a night-light system in accordance with the present invention generally comprises a controller 102 coupled to a first light emitter 104 (e.g., a red light source) and a second light emitter 106 (e.g., a green light source). A suitable timer interface 108 communicates with controller 102 to allow a user to enter various start and stop times as detailed below. Controller 102 is configured to interface with a power supply 110 (e.g., a common household electrical receptacle) to provide power to controller 102 and/or light sources 104 and 106. Controller 102 suitably controls activation of light emitters 104 and 106 in a manner that is responsive to mode information entered by the user into timer interface 108.

Figure 2:
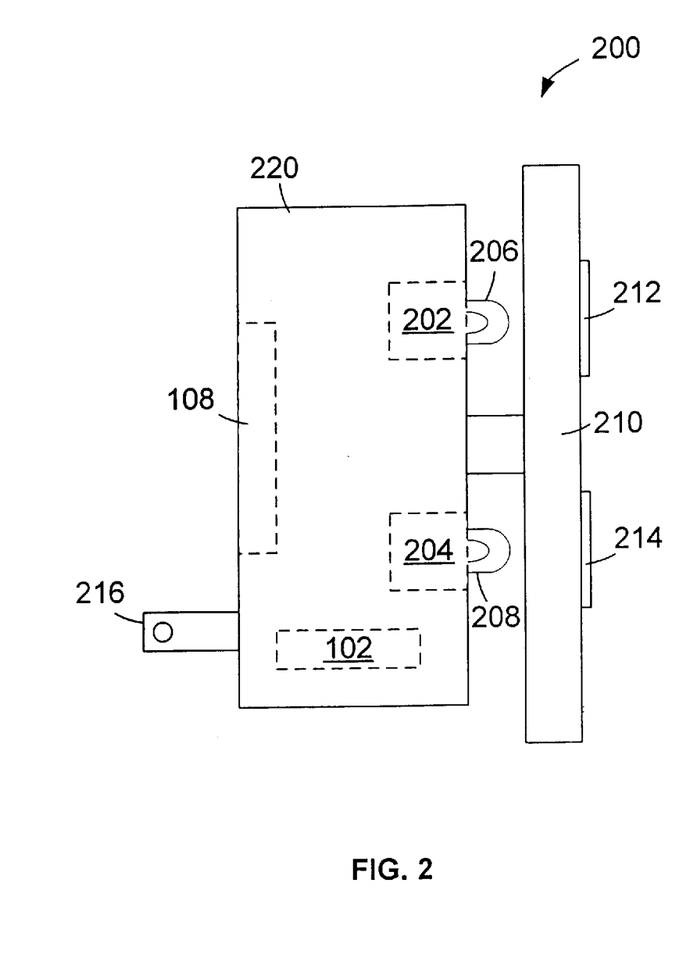
FIG. 2 is an exemplary night-light design in accordance with one embodiment of the present invention.

The various components shown in FIG. 1 may be configured in any number of ways. FIG. 2, for example, shows a night-light 200 which includes a housing 220 which has the controller 102 and timer interface 108 included therein. A plug (e.g., a standard two-prong plug) is coupled to the back side of housing 220 and is electrically coupled to controller 102. Controller 102 is also coupled to a first bulb 206 and a second bulb 208, which are preferably inserted within respective sockets 202 and 204 (allowing easy replacement of bulbs 206 and 208).

Timer interface 108 (which may be digital, analog, or a combination thereof) is preferably inset within the back side of housing 220 such that the timer interface is substantially concealed from view when the device is inserted into an electrical receptacle. The timer interface may, for example, be configured as an intuitive circular clock with set-points distributed around its perimeter (such as often seen in connection with standard plug-in timers) or may include a set of digital buttons and/or knobs with a digital readout.

Controller 102 comprises any suitable combination of hardware (analog and/or digital components), software, and/or firmware necessary to accomplish the tasks outlined below. In that regard, any number of conventional components known in the art may be used, including, for example, digital components such as microprocessors, microcontrollers, memory devices (ROM, RAM, etc.), semiconductor timers, and the like, as well as various analog components such as transistors, resistors, capacitors, diodes, relays, and other analog devices well known in the art. Those skilled in the art will recognize how to configure such components to accomplish the goals of the present invention.

The red and green light produced by the red and green lights of the present invention may be provided through a number of conventional methods. In one embodiment, for example, red and green bulbs are used. In another, white bulbs are used, but are configured to shine through red and green semi-transparent layers provided within the front surface or faceplate of the device. For example, with continued reference to FIG. 2, a faceplate 210 may be suitably attached to housing 220 such that bulb 206 shines through a semi-transparent red material layer 212 and bulb 208 shines through a semi-transparent green material layer 214. Faceplate 210 may be permanently attached to housing 220, or may be removeably attached through, for example, one or more screws, thus further facilitating easy replacement of bulbs 206 and 208.

While the illustrated embodiment incorporates standard electrical bulbs, the present invention is not so limited. In accordance with another embodiment of the present invention, for example, light emitting diodes (LEDs) are used to produce the requisite red and green light.

As mentioned briefly above, the first mode corresponds to first light emitter 206 being activated ("bed-time" mode), the second mode corresponds to the second light emitter being activated ("wake-time" mode) 208, and the third mode corresponds to the case where neither the first or second light emitters are activated ("off" mode). The front side of the night-light (e.g., face plate 210) is configured to substantially simulate the appearance of a traffic signal when used in conjunction with the first and second light emitters.

Figure 3:
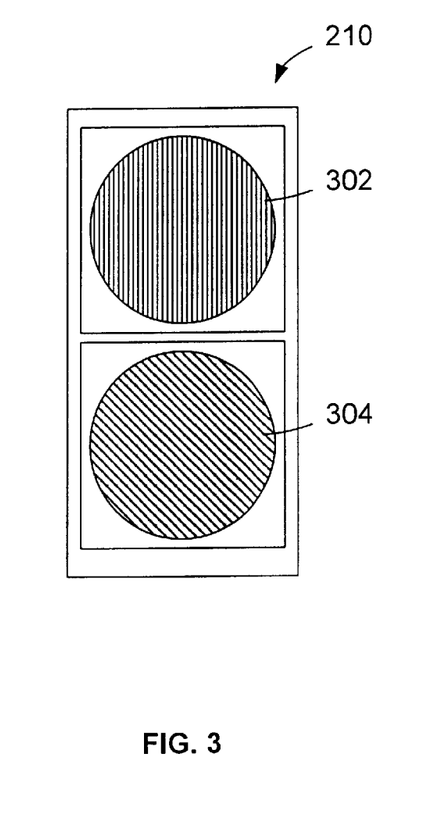
FIGS. 3, 4, and 5 show alternate embodiments of a traffic signal configuration for use in connection with the night-light of the present invention.

More particularly, referring to FIG. 3, faceplate 210 (or, more generally, the front of the device) may be configured to include a top signal 302 (e.g., a red light source) and a bottom signal 304 (e.g., a green light source). Alternatively, the position of the two lights may be inverted, rotated 90 degrees, or otherwise positioned as may be appropriate.

Figure 4:
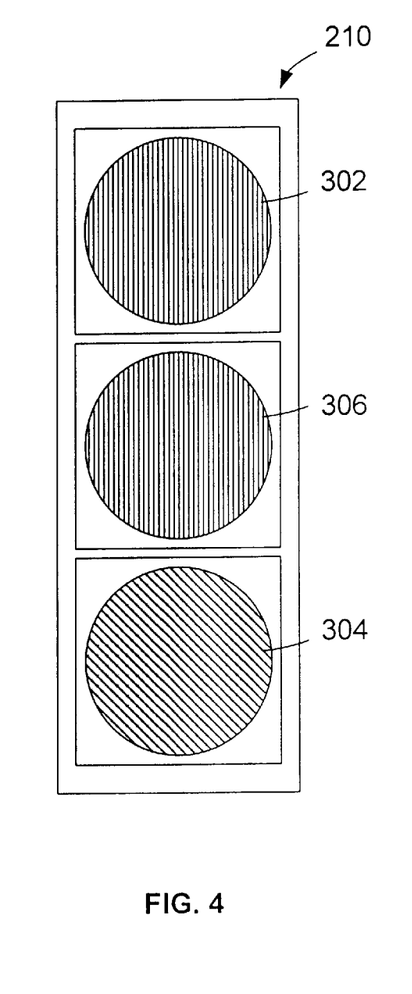

In another embodiment, three regions are included as shown in FIG. 4. That is, a third, middle region 306 is positioned between signal 302 and signal 304. This embodiment effectively emulates a standard traffic signal wherein signals 302, 306, and 304 generally correspond to red, yellow, and green lights respectively. It is not necessary that central region 306 be illuminated. That is, central region 306 may merely include a yellow lens or circular region without an associated light bulb or LED.

Figure 5:
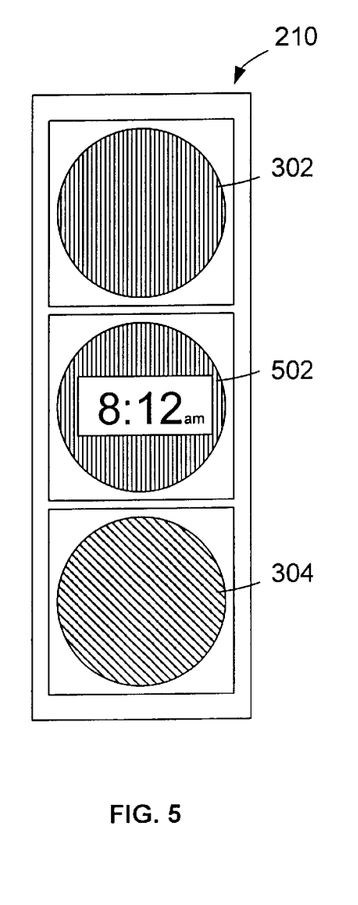

Alternatively, as shown in FIG. 5, a suitable clock face 502 may be provided within the central region. Timer interface 108 (FIG. 1) would then include additional logic for setting this clock. Clock face 502 may be analog, digital, or a combination thereof, and may also include other information displays such as date and temperature. In a preferred embodiment, clock face 502 includes a standard LED clock configuration.

Referring again to FIG. 2, the user first utilizes the timer interface 108 provided on night-light 200 to set the starting times corresponding to the three modes. The timing of the various modes can be selected such that the red light 206 activates when the child is first put to bed, and then stays on throughout the night. If the child for any reason wakes up while the device is still in the bed-time mode, the red light produced by the device will provide a visual cue to the child that he or she should stay in bed. In the morning, however, when the device enters the wake-up mode and the green light 208 has been activated, the child will interpret the green light to mean that he or she may then get up from bed. After a suitable amount of time (predetermined by the user or otherwise determined) the device will enter the off-mode, and both the green and red lights will be deactivated.

Figure 6:
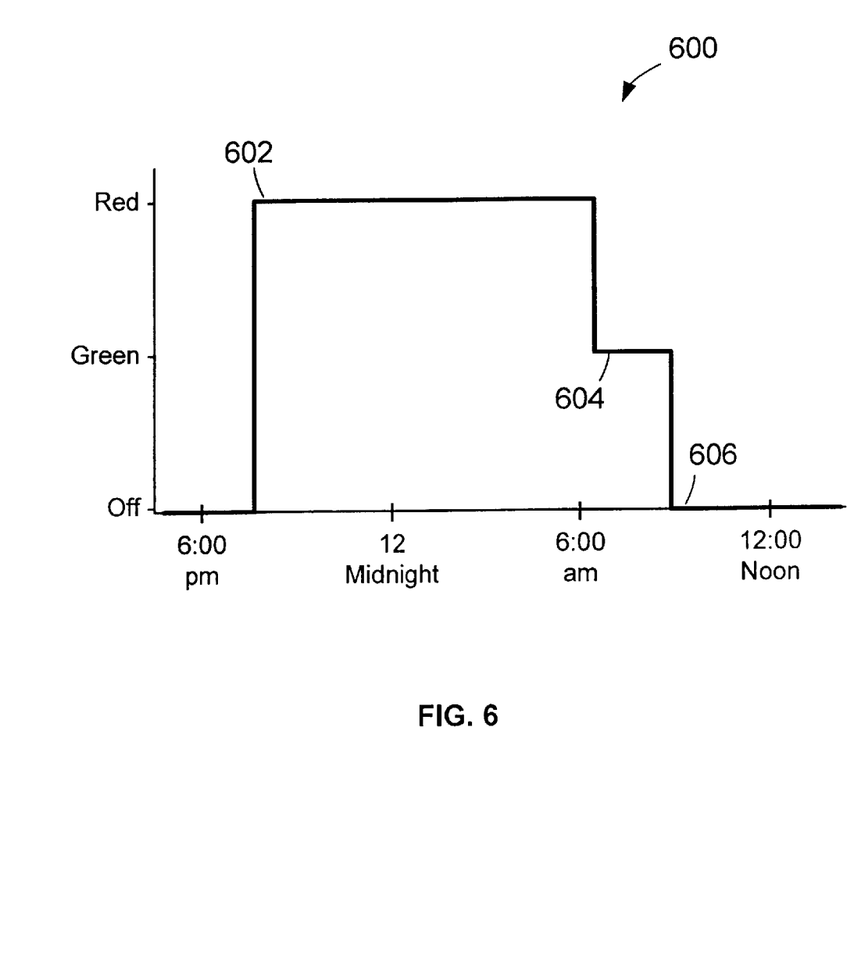
FIGS. 6 and 7 show various example timing diagrams in accordance with the present invention.

In this regard, the timer interface preferably includes appropriate dials, buttons, displays, etc. to accomplish at least the following functions:

1. Set start of bed-time mode
2. Set start of wake-up mode
3. Set end of wake-up mode (start of off-mode)
4. Set clock time FIG. 6 shows an example timing diagram which illustrates operation of the various modes of the present invention. At the start of bed-time mode (602), the red light is activated. The red light continues until the start of wake-time mode (604), whereupon the red light is deactivated and the green light is activated. Finally, at the end of wake-time mode, the device enters an off mode (606) where both lights are deactivated. It will be understood that the times shown in FIG. 6 are merely for the purpose of illustrating operation of the present invention, and that any combination of start and stop times may be employed.

Figure 7:
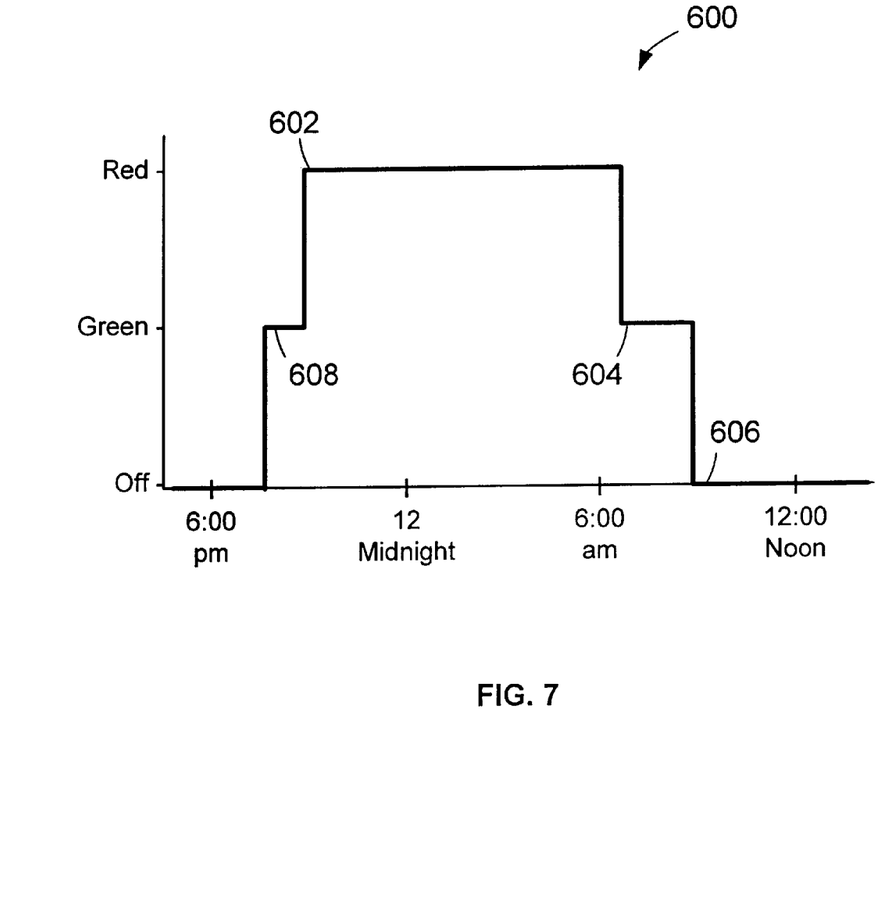

In an alternate embodiment, relative time intervals are entered into the timing interface rather than specific times. More particularly, in contrast to the first three functions listed above, the timing interface may be configured to set the following parameters:

1. Start of bed-time mode
2. Duration of bed-time mode (i.e., in hours)
3. Duration of wake-up mode In accordance with a further aspect of the present invention, the timer interface may be configured to allow a user to specify a fourth time which corresponds to the beginning of an initial time period prior to said first bed-time mode. This embodiment effectively makes allowances for the fact that children do not typically go to sleep right away, and thus provides a green visual cue during an initial time period in which the child may rise from bed temporarily. In such an embodiment, the timing interface is preferably configured to set the following parameters:

1. Start of initial time period
2. Start of bed-time mode
3. Start of wake-up mode
4. Start of off mode Alternatively, as mentioned above, relative time intervals may be entered to accomplish the same result. Furthermore, the use of an initial time period may be toggled on and off; i.e., the timing interface may be configured to provide the following settings:

1. Initial time period (off/on)
2. Start of initial time period
3. Start of bed-time mode
4. Duration of bed-time mode
5. Duration of wake-up mode FIG. 7 shows a timing diagram in accordance with an embodiment that incorporates an initial time period. In particular, the green light is activated at the beginning of the initial time period (608). At the start of the bed-time mode (602), the red light is activated and the green light is deactivated. At the start of the wake-up mode (604), the green light is again activated and remains on until the off-mode is triggered (606).

Although the invention has been described herein in conjunction with the appended drawings, those skilled in the art will appreciate that the scope of the invention is not so limited.

For example, systems in accordance with the present invention may also include various motion sensors, light sensors, infrared remote control units, auditory sensors, smoke alarms, carbon-monoxide detectors, and secondary lighting. The system may include a battery back-up to prevent AC power-loss from disabling the device.

In accordance with another embodiment of the present invention, a signaling device comprises a stand-alone unit of any convenient size that can provide visual cues such as those described above to two or more children, for example, a plurality of children attending a day care. Such a device may be used in connection with naps, quiet time, and/or to signal the end of an activity (e.g., "play time").

In accordance with yet another embodiment of the present invention, the night-light includes one or more outlets on the exterior of the housing to provide a standard household timer for one or more devices plugged into the exterior outlets.

While the illustrated embodiment is configured to produce simple and unambiguous visual cues, other more complicated modes may also be included. For example, the device may employ a motion sensor to detect that the child has moved from bed during the bed-time mode and, in response, cause the red light (or yellow light) to become brighter, blink, or provide other feedback.

Similarly, while the illustrated device has a predetermined wake-up time prior to entering the off-mode, it may be advantageous to incorporate a light sensor to trigger the off mode (and/or the wake-up mode) when a sufficient amount of daylight has entered the room.

These and other modifications in the selection, design, and arrangement of the various components and steps discussed herein may be made without departing from the scope of the invention as set forth in the appended claims.

What is claimed is:

1. A three-mode night-light configured to emulate a traffic signal, said night-light comprising:

a first light emitter;

a second light emitter, wherein said first light emitter emits substantially red light, and said second light emitter emits substantially green light; and a controller coupled to said first and second light emitters, said controller configured to operate in a first, second, and a third mode, wherein said first mode corresponds to said first light emitter being activated, said second mode corresponds to said second light emitter being activated, and said third mode corresponding to neither of said first or second light emitters being activated.

2. The night-light of claim 1, further including a timer interface configured to allow a user to specify a first time corresponding to said first mode, a second time corresponding to said second mode, and a third time corresponding to said third mode.

3. The night-light of claim 2, wherein said timer interface is further configured to allow a user to specify a fourth time corresponding to the beginning of an initial time period prior to said first mode being activated at said first time.

4. A night-light configured to emulate a traffic signal, said night-light comprising:

a controller coupled to a power supply;

a timer interface coupled to said controller;

a red light emitter coupled to said controller;

a green light emitter coupled to said controller;

said controller configured to operate in a first, second, and a third mode, wherein said first mode corresponds to said red light emitter being activated, said second mode corresponds to said green light emitter being activated, and said third mode corresponding to neither of said green or red light emitters being activated; and said timer interface configured to allow a user to specify a first time corresponding to said first mode, a second time corresponding to said second mode, and a third time corresponding to said third mode.

5. The night-light of claim 4, wherein said timer interface is further configured to allow a user to specify a fourth time corresponding to the beginning of an initial time period prior to said first mode being activated at said first time.

6. A night-light configured to emulate a traffic signal, said night-light comprising:

a housing, said housing comprising a first light emitter, a second light emitter, a controller electrically coupled to said first light emitter and said second light emitter, and a timer interface electrically coupled to said controller, said controller configured to operate in a first, second, and a third mode, wherein said first mode corresponds to said first light emitter being activated, said second mode corresponds to said second light emitter being activated, and said third mode corresponding to neither of said first or second light emitters being activated;

a plug electrically coupled to said controller and said first and second light emitters, said plug configured to be inserted into an electrical receptacle;

a faceplate attached to said housing, said faceplate configured to substantially simulate the appearance of a traffic signal.

7. The night-light of claim 6, wherein said first light emitter comprises a red light bulb, said second light emitter comprises a green light bulb, and said red and green light bulbs are positioned with respect to said faceplate to simulate the appearance of a traffic signal.

8. The night-light of claim 6, wherein said timer interface is further configured to allow a user to specify a fourth time corresponding to the beginning of an initial time period prior to said first mode being activated at said first time.

9. The night-light of claim 6, wherein said first light emitter comprises a substantially white light bulb shining through a semi-transparent red circular region in said faceplate.

10. The night-light of claim 6, wherein said second light emitter comprises a substantially white light bulb shining through a semi-transparent green circular region in said faceplate.

11. The night-light of 6, wherein said faceplate includes a top signal region corresponding to said first light emitter and a bottom signal region corresponding to said second light emitter, wherein said first light emitter emits a red light, and said second light emitter emits a green light.

12. The night-light of claim 11, further comprising a middle signal region positioned between and co-linear with said top and bottom signal regions.

13. The night-light of claim 12, wherein said middle signal region includes a digital clock display settable via said timer interface.

14. The night-light of claim 6, wherein said plug is attached to a back side of said housing, and wherein said timer interface is provided within said back side of said housing such that said timer interface is substantially concealed from view when said plug is inserted into an electrical receptacle.

15. The night-light of claim 6, wherein said first light emitter includes a red light emitting diode, and said second light emitter comprises a green light emitting diode.

16. The night-light of claim 6, wherein said housing further includes a first bulb socket configured to accept a first bulb associated, with said first light emitter, and a second bulb socket configured to accept a second bulb associated with said second light emitter.

17. A traffic signal night-light configured to train a child to remain in bed during a predetermined interval, said night-light comprising:

a housing having a back side and a front side, said housing comprising a green light source, a red light source, a controller electrically coupled to said red light source and said green light source, and a timer interface electrically coupled to said controller, said controller configured to operate in a bed-time mode, a wake-up mode, and an off mode, wherein said bed-time mode corresponds to said red light source being activated, said wake-up mode corresponds to said green light source being activated, and said off mode corresponds to neither of said red or green light sources being activated;

a plug provided on said back side of said housing and electrically coupled to said controller and said red and green light sources, said plug configured to be inserted into an electrical receptacle;

said timer interface configured to allow a user to specify a first time corresponding to said bed-time mode, a second time corresponding to said wake-up mode, and a third time corresponding to said off mode, said timer interface being provided within said back side of said housing such that said timer interface is substantially concealed from view when said plug is inserted into said electrical receptacle; and said front side of said housing being configured to substantially simulate the appearance of a traffic signal when used in conjunction with said red light source and said green light source.

\* \* \* \* \*